US012646884B2

(12) United States Patent
Watanabe et al.

(10) Patent No.: US 12,646,884 B2
(45) Date of Patent: Jun. 2, 2026

(54) ELECTRICAL CONNECTOR WITH LATCHING MECHANISM FOR A TERMINAL AND METHOD OF EXTRACTING THE TERMINAL FROM THE ELECTRICAL CONNECTOR

(71) Applicant: Yazaki Corporation, Tokyo (JP)

(72) Inventors: Tetsuya Watanabe, Shizuoka (JP); Yuko Mizuno, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 269 days.

(21) Appl. No.: 18/505,451

(22) Filed: Nov. 9, 2023

(65) Prior Publication Data

US 2024/0186738 A1 Jun. 6, 2024

(30) Foreign Application Priority Data

Dec. 5, 2022 (JP) ................................ 2022-194329

(51) Int. Cl.
*H01R 13/436* (2006.01)
*H01R 13/422* (2006.01)
(Continued)

(52) U.S. Cl.
CPC ..... *H01R 13/4364* (2013.01); *H01R 13/4223* (2013.01); *H01R 13/436* (2013.01); *H01R 13/5202* (2013.01); *H01R 13/5205* (2013.01); *H01R 43/22* (2013.01); *H01R 13/42* (2013.01); *H01R 13/422* (2013.01); *H01R 13/426* (2013.01); *H01R 13/5208* (2013.01);
(Continued)

(58) Field of Classification Search
CPC ............ H01R 13/4364; H01R 13/4223; H01R 13/436; H01R 13/5202; H01R 13/5205; H01R 43/22; H01R 13/42; H01R 13/422; H01R 13/426; H01R 13/5208; H01R 13/521; H01R 13/5219; H01R 13/5221; H01R 43/20
See application file for complete search history.

(56) References Cited

U.S. PATENT DOCUMENTS

2002/0187676 A1 12/2002 Kurimoto et al.
2004/0147175 A1 7/2004 Aihara et al.
(Continued)

FOREIGN PATENT DOCUMENTS

JP 2002-367709 A 12/2002
JP 2004-247227 A 9/2004

*Primary Examiner* — Justin M Kratt
(74) *Attorney, Agent, or Firm* — Banner & Witcoff, Ltd.

(57) ABSTRACT

A connector and a terminal extracting method in a connector are provided. The connector includes a terminal, a housing having a terminal accommodating chamber in which the terminal is accommodated, and a side retainer attached to the housing. The terminal accommodating chamber is provided with an elastically deformable locking lance such that the locking lance is to be locked to the terminal. A distal end portion of the locking lance is provided with a jig hooking portion to come into contact with a jig inserted into the terminal accommodating chamber when releasing locking with the terminal. The side retainer is provided with a guide portion guiding the jig such that the jig comes into contact with the jig hooking portion and does not interfere with the terminal when being inserted into the terminal accommodating chamber.

3 Claims, 8 Drawing Sheets

(51) Int. Cl.

| | |
|---|---|
| ***H01R 13/52*** | (2006.01) |
| ***H01R 43/22*** | (2006.01) |
| *H01R 13/42* | (2006.01) |
| *H01R 13/426* | (2006.01) |
| *H01R 43/20* | (2006.01) |

(52) U.S. Cl.
CPC ........ *H01R 13/521* (2013.01); *H01R 13/5219* (2013.01); *H01R 13/5221* (2013.01); *H01R 43/20* (2013.01)

(56) References Cited

U.S. PATENT DOCUMENTS

| | | | | |
|---|---|---|---|---|
| 2005/0020132 | A1 | 1/2005 | Aihara et al. | |
| 2017/0077636 | A1* | 3/2017 | Nagasawa .......... | H01R 13/4362 |
| 2020/0153162 | A1* | 5/2020 | Mamiya ............... | H01R 13/428 |

* cited by examiner

ELECTRICAL CONNECTOR WITH LATCHING MECHANISM FOR A TERMINAL AND METHOD OF EXTRACTING THE TERMINAL FROM THE ELECTRICAL CONNECTOR

CROSS-REFERENCE TO RELATED APPLICATIONS

This application is based on and claims priority under 35 USC 119 from Japanese Patent Application No. 2022-194329 filed on Dec. 5, 2022, the contents of which are incorporated herein by reference.

TECHNICAL FIELD

The present disclosure relates to a connector and a terminal extracting method in a connector.

BACKGROUND ART

In the related art, a connector including a terminal and a housing having a terminal accommodating chamber (also referred to as a "cavity") has been proposed. In the connector in the related art, a locking lance is provided in the terminal accommodating chamber, and when a terminal is inserted to a predetermined position of the terminal accommodating chamber, the terminal is locked by the locking lance to be prevented from coming out of the terminal accommodating chamber. On the other hand, in a case of extracting (detaching) the terminal from the terminal accommodating chamber, in order to release the locking between the terminal and the locking lance, a jig is used. As an example, by inserting the jig into the terminal accommodating chamber and operating the same, the locking between the terminal and the locking lance is released, and by pulling out the terminal in this state, the terminal is detached from the terminal accommodating chamber (see, for example, JP2004-247227A).

In the connector of JP2004-247227A, to detach the terminal from the terminal accommodating chamber, the jig inserted into a space between the terminal and the locking lance is advanced to the predetermined position, the locking lance is bent to release the locking with the terminal, and the terminal is pressed and retracted by using the jig. As a result, although the terminal is easily detached from the terminal accommodating chamber, contact between the terminal and the jig may scrape a surface of the terminal, resulting in shavings and the like. If the shavings and the like generated in this manner adhere to the terminal, a conduction failure with a counterpart terminal or a decrease in the waterproof performance of the terminal may occur.

The present disclosure has been made in view of the above-described circumstances, and an object of the present disclosure is to provide a connector that prevents a defect in a terminal caused by terminal extracting work and is excellent in workability, and a terminal extracting method in a connector.

In order to achieve the above object, a connector according to the present disclosure is characterized by the following.

SUMMARY OF INVENTION

The present disclosure provides a connector including a terminal, a housing having a terminal accommodating chamber in which the terminal is accommodated, and a side retainer attached to the housing. The terminal accommodating chamber is provided with an elastically deformable locking lance extending in an insertion direction of the terminal into the terminal accommodating chamber such that the locking lance is to be locked to the terminal. A distal end portion of the locking lance in the insertion direction is provided with a jig hooking portion to come into contact with a jig inserted into the terminal accommodating chamber when releasing locking with the terminal. The side retainer is provided with a guide portion configured to guide the jig such that the jig comes into contact with the jig hooking portion and does not interfere with the terminal when being inserted into the terminal accommodating chamber.

The present disclosure provides a terminal extracting method in a connector including the above connector the jig, the terminal extracting method in a connector including inserting the jig into the terminal accommodating chamber in a state of being in contact with the guide portion such that the jig comes into contact with the jig hooking portion, and operating the jig such that the locking lance is elastically deformed to release locking between the terminal and the locking lance.

The present disclosure has been briefly described above. Further, details of the present disclosure can be clarified by reading modes for carrying out the disclosure (hereinafter, referred to as "embodiments") described below with reference to the accompanying drawings.

DESCRIPTION OF EMBODIMENTS

Embodiment

Figure 1:
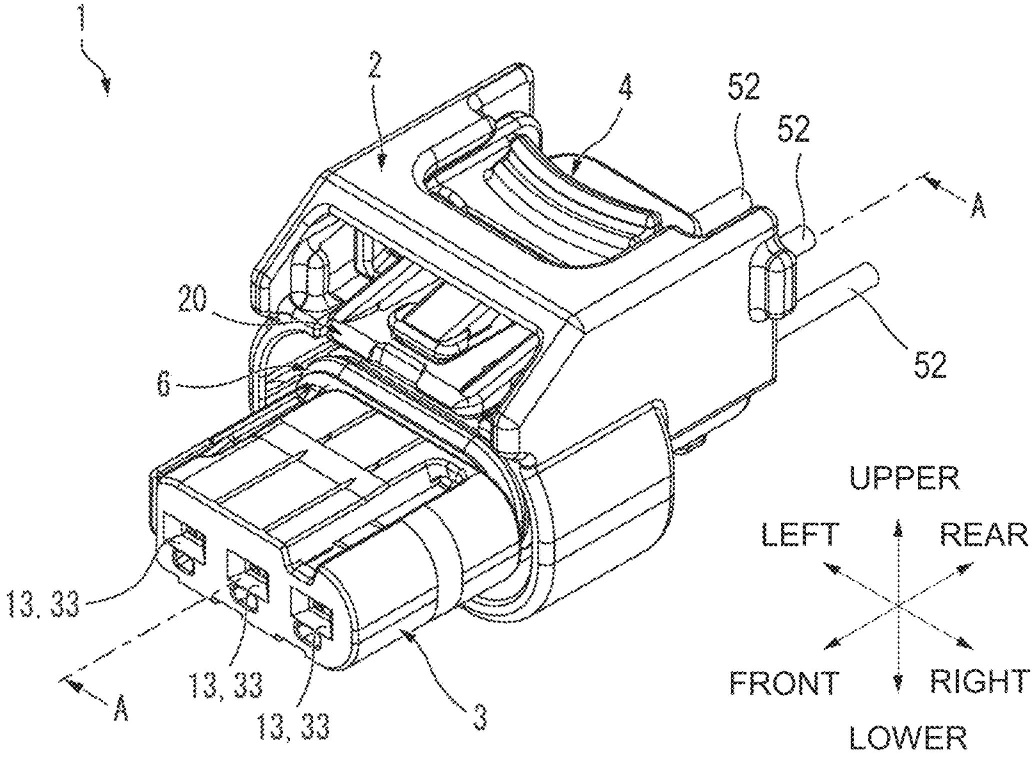
FIG. 1 is a perspective view of a connector according to an embodiment of the present disclosure.

Hereinafter, a connector 1 according to an embodiment of the present disclosure and a terminal extracting method in the connector 1 will be described with reference to the drawings.

Hereinafter, for convenience of description, as shown in FIGS. 1 to 10, "front", "rear", "left", "right", "upper", and "lower" are defined. A "front-rear direction", a "left-right direction", and an "upper-lower direction" are orthogonal to one another. The front-rear direction corresponds to an "insertion direction" in the present disclosure.

Schematic Configuration of Connector 1

Hereinafter, a schematic configuration of the connector 1 will be described with reference to FIG. 1. The connector 1 includes a tubular housing 2, a side retainer 3 attached to the housing 2, a fitting detection member 4 slidably attached to an outer surface of the housing 2, a terminal 51 (female terminal in the present embodiment) accommodated in the housing 2, and an annular seal member 6 attached to the housing 2. In the present embodiment, the connector 1 is a female connector configured to be fitted to a counterpart connector (not shown, male connector) along a front-rear direction.

Housing 2

Hereinafter, the housing 2 will be described with reference to FIGS. 2 to 4 and FIG. 6. The housing 2 is made of a synthetic resin and integrally includes a tubular housing body 11 and a tubular hood portion 12 that covers an outer peripheral surface of the housing body 11 with a space left therebetween (see FIGS. 2 to 4 and 6). A housing of the counterpart connector (also referred to as a "counterpart housing") is inserted into the space between the outer peripheral surface of the housing body 11 and an inner peripheral surface of the hood portion 12.

The housing body 11 is formed with a plurality of (in the present embodiment, three) terminal accommodating chambers 13 into which a plurality of (in the present embodiment, three) terminals 51 (terminal-attached electric wires 5) are respectively inserted from a rear side. Each terminal accommodating chamber 13 is opened to the outside through an opening at a front end portion of the housing body 11, and a terminal of the counterpart connector (not shown, a male terminal, also referred to as a "counterpart terminal") is inserted through the opening.

The housing body 11 is formed to protrude forward from a front end surface of the hood portion 12, and the seal member 6 is attached to a tubular outer peripheral surface of the housing body 11 covered by the hood portion 12. The housing body 11 is attached with the side retainer 3 on an outer peripheral surface of a substantially rectangular semi-tubular front end portion 14 protruding forward from the hood portion 12.

Cantilevered locking lances 15 extending forward so as to be elastically deformable in an upper-lower direction are formed in the housing 2 so as to face the inside of the terminal accommodating chambers 13 from below (see FIGS. 3 and 6). The terminals 51 inserted into the terminal accommodating chambers 13 are locked to the locking lances 15 respectively (see FIGS. 6 to 9). A jig hooking portion 15*a* to come into contact with a jig 7 when releasing the locking with the terminal 51 is provided at a lower end portion in a front end portion of the locking lance 15 so as to protrude forward. (see FIGS. 7 to 8).

Figure 2:
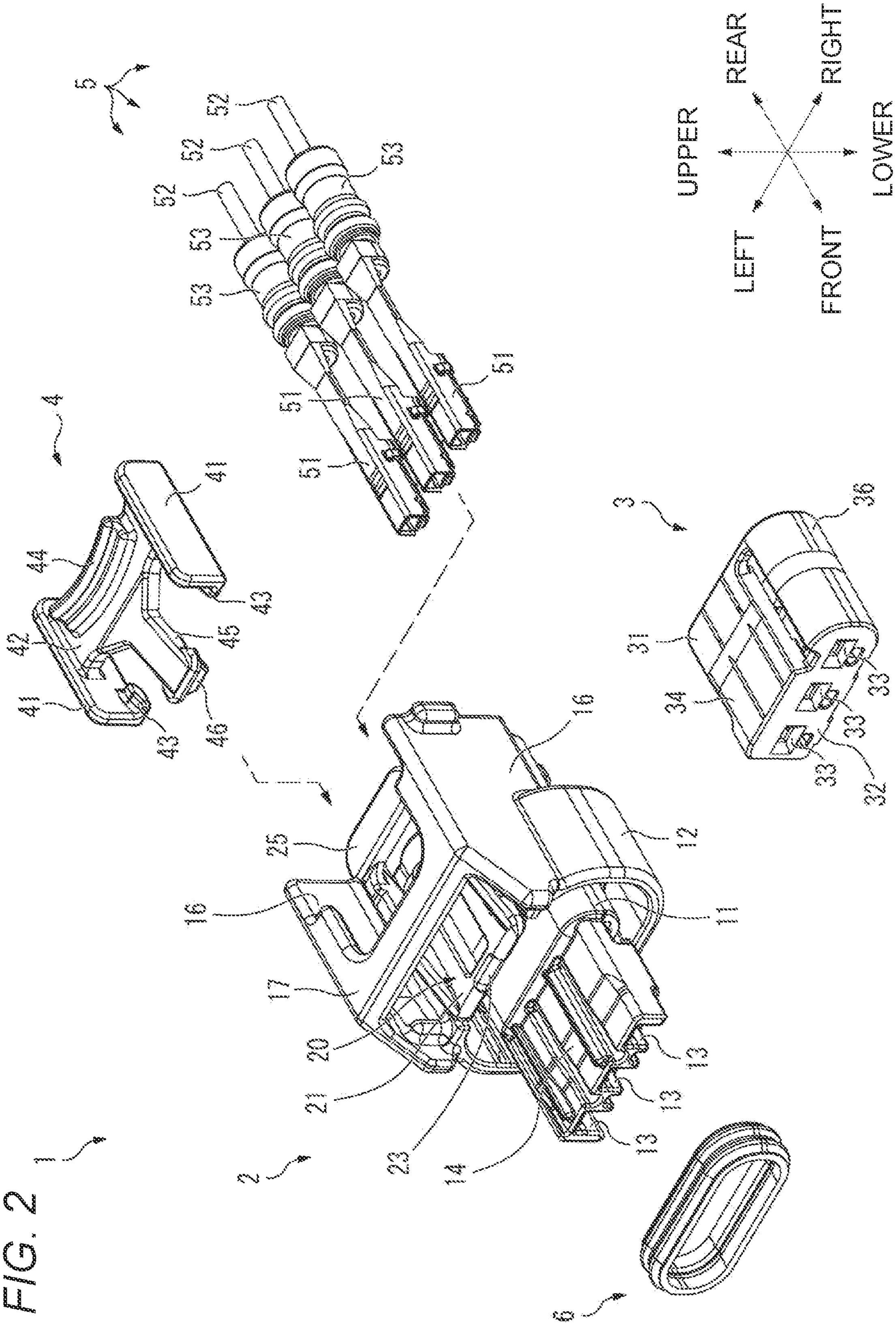
FIG. 2 is an exploded perspective view of a main part of the connector shown in FIG. 1.
Figure 4:
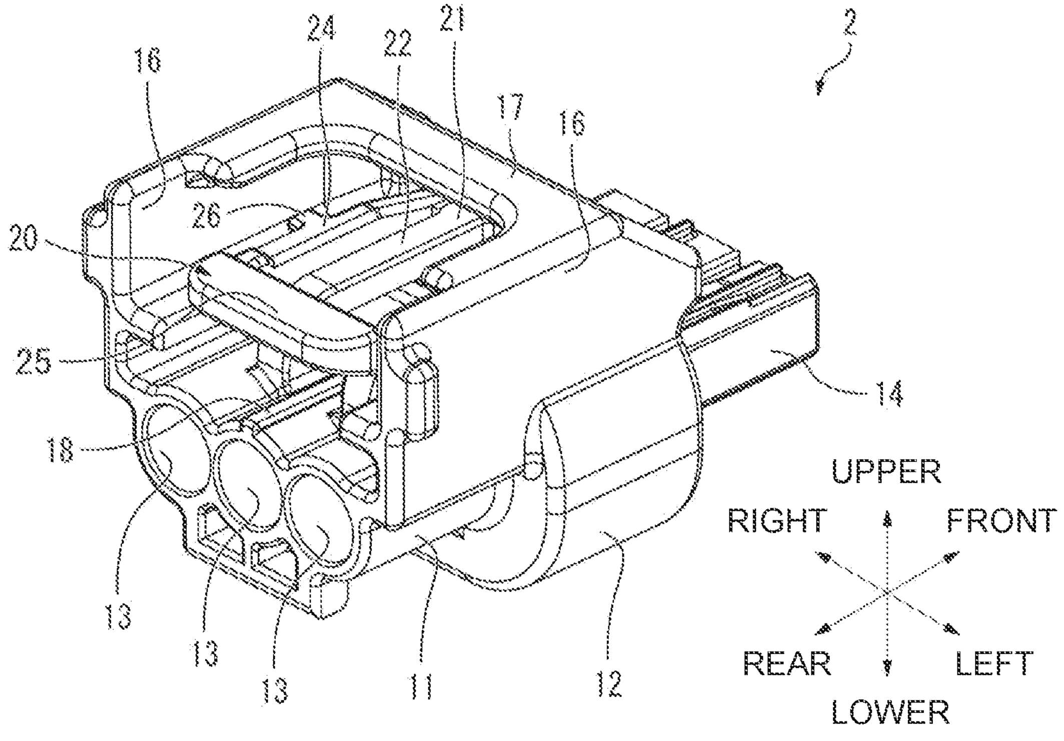
FIG. 4 is a perspective view of the housing as viewed from a rear side.

A locking mechanism 20 is provided on an upper outer face (upper face) of the housing 2 (see FIGS. 1 to 2 and 4). The locking mechanism 20 includes an elastically deformable lock arm 21 and an elastically deformable release arm 24 (see FIG. 4).

Figure 6:
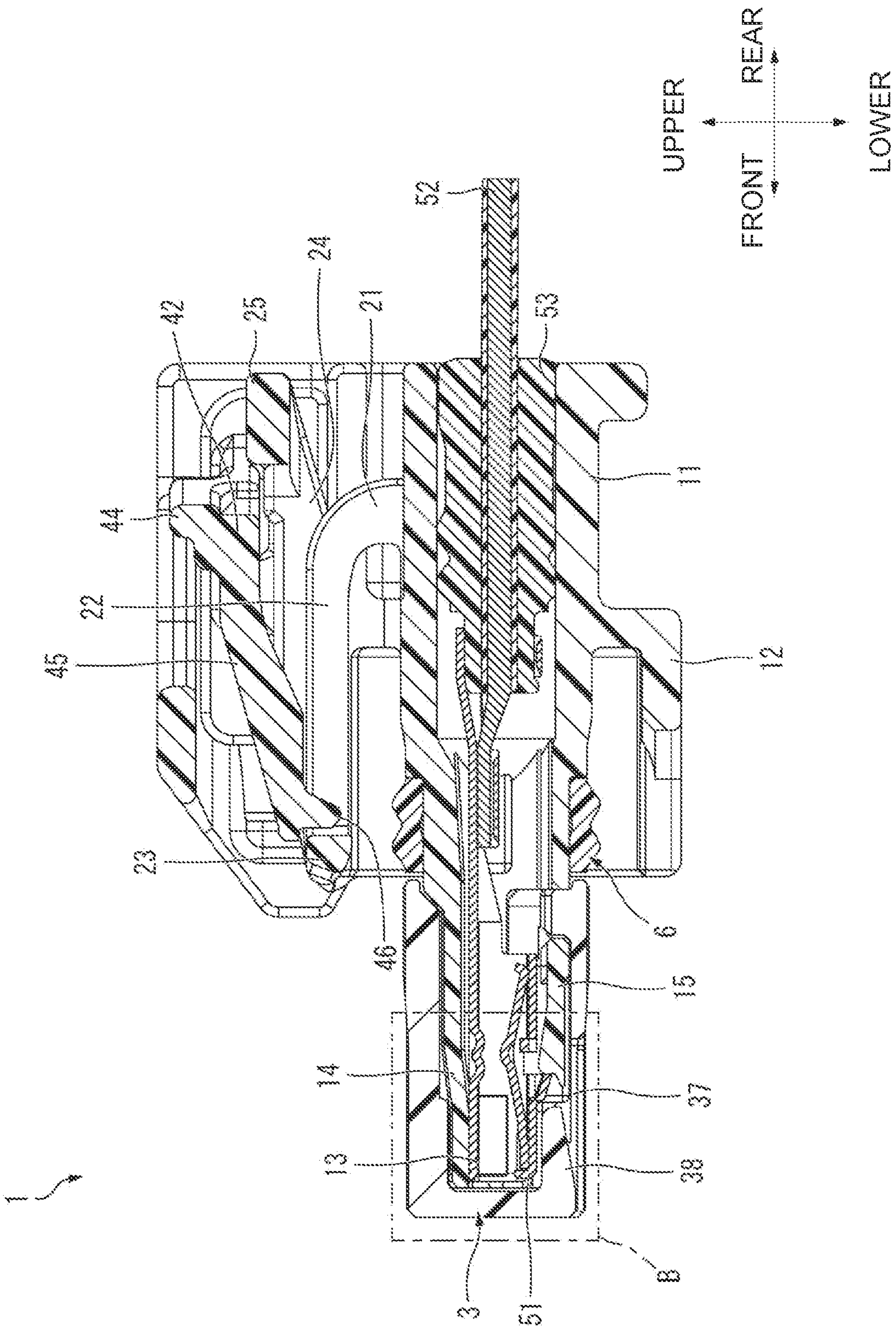
FIG. 6 is a cross-sectional view taken along a line A-A of FIG. 1.

The lock arm 21 is formed in a substantially rectangular U-shape and integrally includes a pair of left and right elastic arm pieces 22 supported on the upper face of the housing 2 in a cantilever manner and extending forward substantially parallel to the upper face of the housing 2, and a locking piece 23 for bridging front end portions of the elastic arm pieces 22 in a left-right direction (see FIGS. 4 and 6). The locking piece 23 is locked with a locking portion (not shown) of the counterpart housing in a state in which the connector 1 and the counterpart connector are fitted.

The lock arm 21 is supported at the front end portions of the pair of elastic arm pieces 22 in a cantilever manner, and is connected to the substantially rectangular U-shaped release arm 24 extending rearward (see FIGS. 4 and 6).

The release arm 24 includes a lock release operating portion 25 to be pressed down when locking between the locking piece 23 and the locking portion of the counterpart housing is released (see FIGS. 4 and 6). The lock release operating portion 25 is separated from the housing 2 in the upper-lower direction, and is disposed above the elastic arm piece 22. When the lock release operating portion 25 is pressed down and displaced downward, an upward locking release force is applied to the locking piece 23 via the release arm 24.

Figure 3:
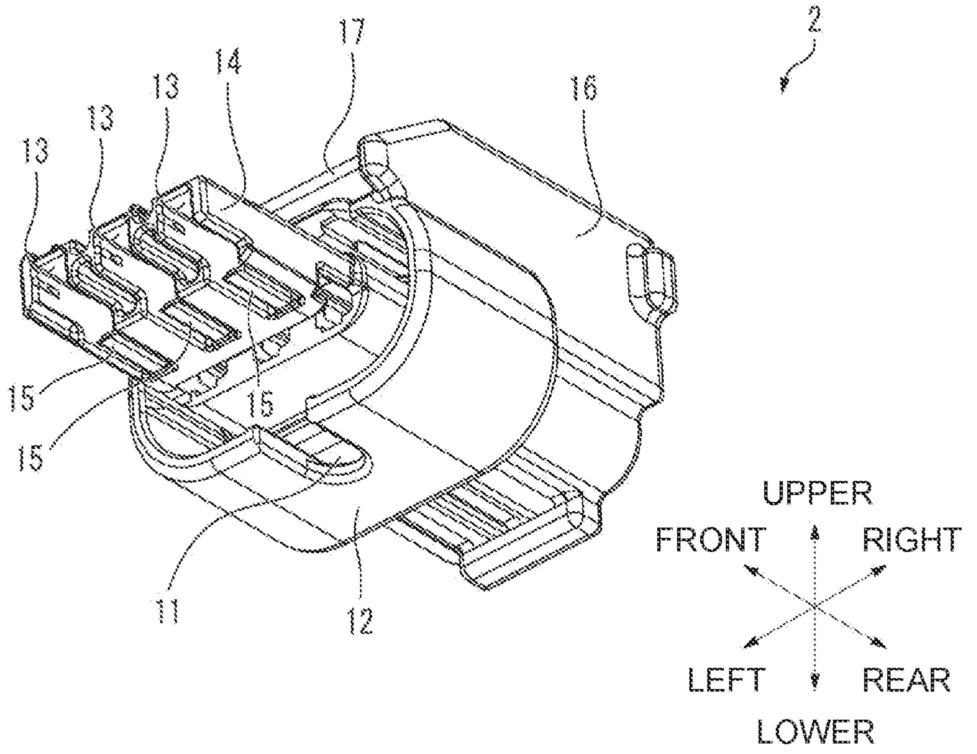
FIG. 3 is a perspective view of a housing as viewed from below.

The housing 2 is provided with a pair of protection wall portions 16 so as to sandwich the lock arm 21 in the left-right direction (see FIGS. 2 to 4). The pair of protection wall portions 16 stand on an upper portion of the hood portion 12 to protect the locking mechanism 20. A beam portion 17 is provided in front of the protection wall portions 16 (see FIGS. 2 to 4). Both end portions of the beam portion 17 in the left-right direction are connected to the protection wall portions 16, and are disposed with a space with respect to the hood portion 12.

Locked protrusions 26 protruding toward the facing protection wall portions 16 are provided on both side faces of the release arm 24 in the left-right direction (see FIG. 4). Locking protrusions 43 of the fitting detection member 4 to be described later is locked to the locked protrusions 26.

On an upper face of a rear end portion of the housing body 11, a restriction rib 18 protruding upward is provided at the substantial center in the left-right direction so as to extend in the front-rear direction (see FIG. 4). A protruding height (length in the upper-lower direction) of the restriction rib 18 is set so that the lock release operating portion 25 is not pressed down more than necessary.

Side Retainer 3

Figure 5:
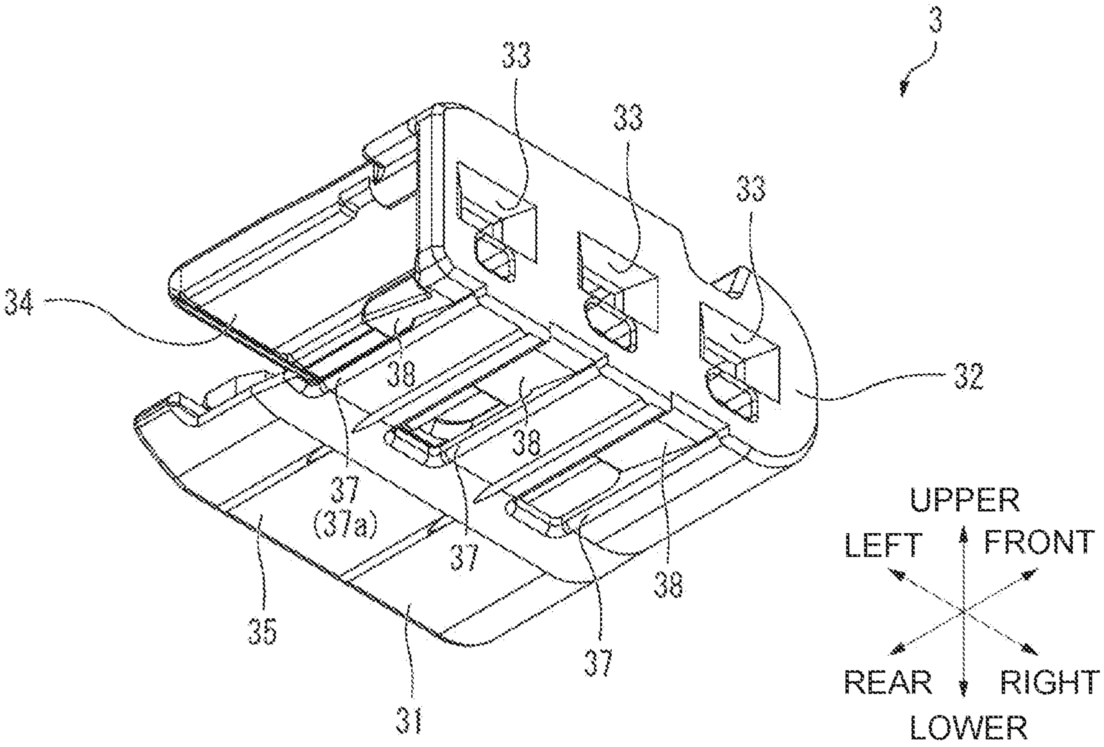
FIG. 5 is a perspective view of a side retainer as viewed from below.

Hereinafter, the side retainer 3 will be described with reference to FIGS. 2 and 5 to 6. The side retainer 3 is made of a synthetic resin and integrally includes a retainer body 31 having a substantially U-shaped cross section and having a left opening, and a retainer front plate portion 32 for closing a front end opening of the retainer body 31 (see FIGS. 2 and 5). A plurality of (in the present embodiment, three) insertion ports 33 are formed in the retainer front plate portion 32 so as to correspond to the plurality of terminal accommodating chambers 13. When the side retainer 3 is attached to the housing 2, the insertion ports 33 communicate with the terminal accommodating chambers 13 (see FIG. 1), and the counterpart terminals are inserted.

The retainer body 31 is integrally formed with a retainer upper face portion 34 (see FIG. 2) and a retainer lower face portion 35 (see FIG. 5) that are spaced apart from each other in the upper-lower direction and face each other, and a retainer curved face portion 36 (see FIG. 2) that connects a right end edge of the retainer upper face portion 34 and a right end edge of the retainer lower face portion 35. A rib shaped retainer protrusion (reference numeral is omitted) extending along the front-rear direction is provided at a left end edge of the retainer upper face portion 34 and protrudes downward.

The retainer lower face portion 35 is provided with substantially rectangular jig insertion ports 37 that penetrate in the upper-lower direction (see FIGS. 5 to 8). In the connector 1, the terminal accommodating chambers 13 and the outside communicate with each other by the jig insertion ports 37, and the jig 7 for extracting a terminal is inserted into the terminal accommodating chamber 13 through the jig insertion port 37. Since the side retainer 3 has the left opening, a jig insertion port 37*a* on a left side is formed in a substantially rectangular U-shape.

A guide portion 38 that guides the jig 7 inserted into the jig insertion port 37 to the jig hooking portion 15*a* of the locking lance 15 is provided at a front end portion of the jig insertion port 37, and extends in the front-rear direction (see FIGS. 5 to 8). The guide portion 38 is formed in an inclined shape rising from a front side toward the rear side.

When the side retainer 3 is attached to the front end portion 14 of the housing body 11, the left opening of the side retainer 3 is slightly expanded, the front end portion 14 is inserted into an inner side of the side retainer 3 from the opening, and the side retainer 3 is moved in the left-right direction. When the side retainer 3 is moved in the left-right direction, the retainer protrusion enters a locking groove (reference numeral is omitted) provided in the front end portion 14 for locking, and therefore, the side retainer 3 is attached to the housing 2. In a state where the side retainer 3 is attached to the housing 2, unintended detachment (removal) of the terminal 51 from the terminal accommodating chamber 13 is prevented.

Fitting Detection Member 4

Hereinafter, the fitting detection member 4 will be described with reference to FIGS. 2 and 6. The fitting detection member 4 is made of a synthetic resin, is attached to the housing 2 from the rear side, and is configured to be slidable in the front-rear direction. The fitting detection member 4 integrally includes a pair of side wall portions 41 that face each other in the left-right direction and a support wall portion 42 that bridges the rear of an upper end portion of each side wall portion 41 (see FIG. 2).

The locking protrusions 43 protruding toward the facing side wall portions 41 are each provided on a facing surface of each side wall portions 41 (see FIG. 2). When the fitting detection member 4 is at a temporary locking position, the locking protrusions 43 are locked to the locked protrusions 26 of the housing 2. A slide operation portion 44, which is operated when the fitting detection member 4 is slid, protrudes from an upper end surface of the support wall portion 42.

An arm piece 45 extending forward is provided at a substantially central portion of the support wall portion 42 in the left-right direction (see FIGS. 2 and 6). The arm piece 45 is supported by the support wall portion 42 in a cantilever manner, and is formed to be inclined downward. A locking claw 46 extending downward is formed at a front end portion of the arm piece 45. The arm piece 45 is configured to be elastically deformable with a rear end portion as a fulcrum such that the locking claw 46 swings upward. When the fitting detection member 4 is at the temporary locking position, the locking claw 46 is in contact with a rear end portion of the locking piece 23 of the housing 2 (see FIG. 6), and when the fitting detection member 4 is at a final locking position, the locking claw 46 is locked to the locking piece 23 (see FIG. 9).

Terminal-Attached Electric Wire 5

Hereinafter, the terminal-attached electric wire 5 will be described with reference to FIG. 2. The terminal-attached electric wire 5 includes the terminal 51, an electric wire 52 having a front end portion to which the terminal 51 is connected, and an annular seal member 53 attached to the electric wire 52.

Assembling Procedure of Members Constituting Connector 1

Hereinafter, an assembling procedure of the members constituting the connector 1 will be described. First, the seal member 6 is attached to the housing 2, and the terminal 51 to which the electric wire 52 is connected is inserted into the terminal accommodating chamber 13 of the housing 2 from the rear side. Thus, the terminal 51 is locked to the locking lance 15 of the housing 2. The seal member 53 attached to the electric wire 52 is also accommodated in a rear end portion of the terminal accommodating chamber 13, so that the terminal accommodating chamber 13 is waterproofed.

Next, the side retainer 3 is attached to the front end portion 14 of the housing body 11. Thus, the terminal 51 is prevented from coming off the side retainer 3.

Next, the fitting detection member 4 is attached to the housing 2 from the rear side to the temporary locking position. At this time, the locking protrusions 43 of the fitting detection member 4 rides over the locked protrusions 26 of the housing 2 to be locked to the front side, so that the fitting detection member 4 is temporarily locked to the housing 2 (see FIG. 6). Thus, assembling of the members constituting the connector 1 is completed, and the connector 1 is completed.

Fitting Procedure of Connector 1 and Counterpart Connector

Hereinafter, a fitting procedure of the connector 1 and the counterpart connector will be described. The fitting between the connector 1 and the counterpart connector is performed in a state where the fitting detection member 4 is temporarily locked to the housing 2. First, the counterpart housing is inserted between the outer peripheral surface of the housing body 11 and the inner peripheral surface of the hood portion 12.

At this time, the locking portion of the counterpart housing rides over from the lower side to the rear side while elastically deforming the locking piece 23 of the housing 2, and the locking portion of the counterpart housing and the locking piece 23 are locked. Thus, the locking claw 46 of the arm piece 45 of the fitting detection member 4 is lifted upward by the locking portion of the counterpart housing (that is, the arm piece 45 is elastically deformed), and a contact state of the locking claw 46 to the rear end portion of the locking piece 23 is released.

Figure 9:
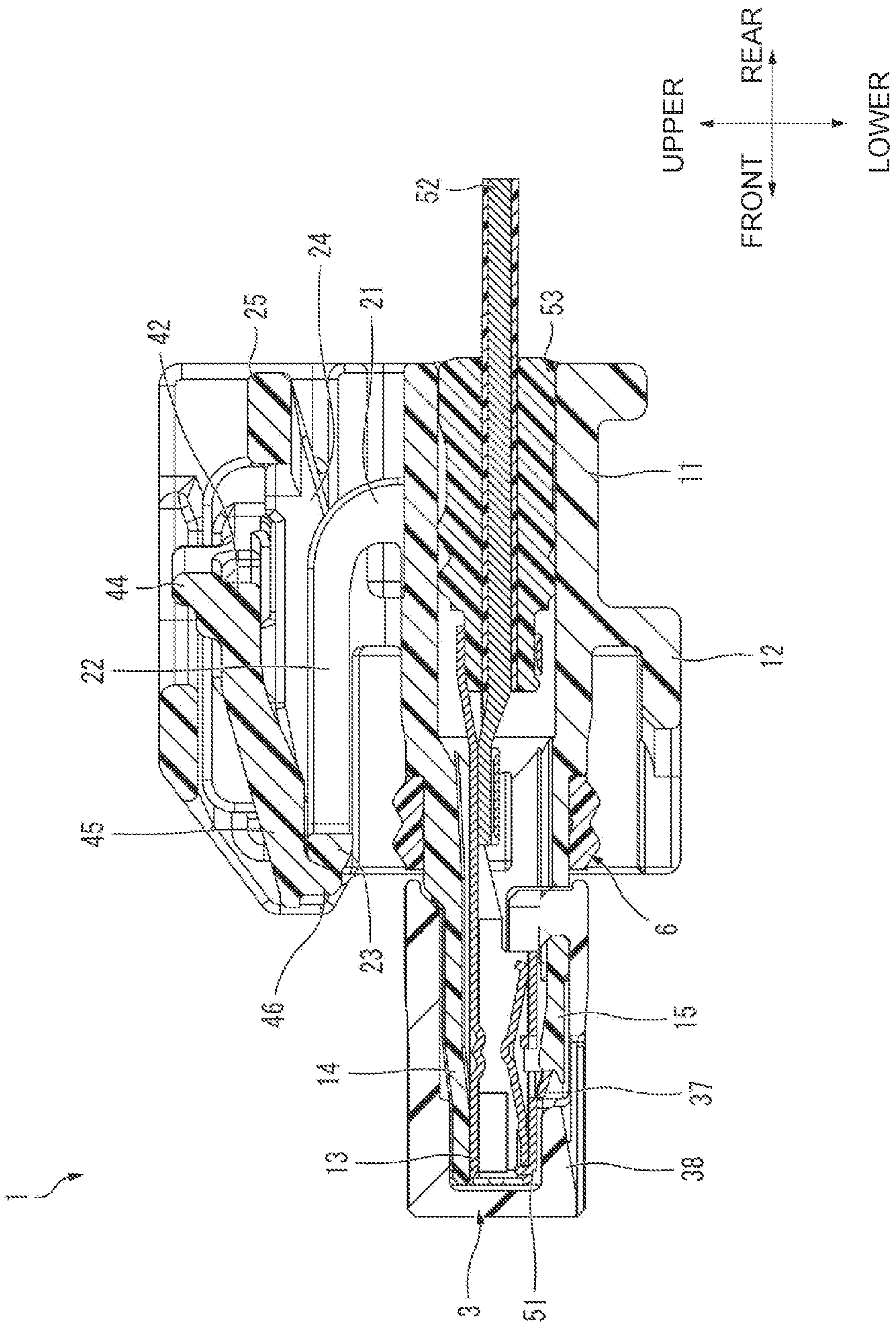
FIG. 9 is a view corresponding to FIG. 6 when a fitting detection member is at a final locking position (illustration of a counterpart connector is omitted)
Figure 10:
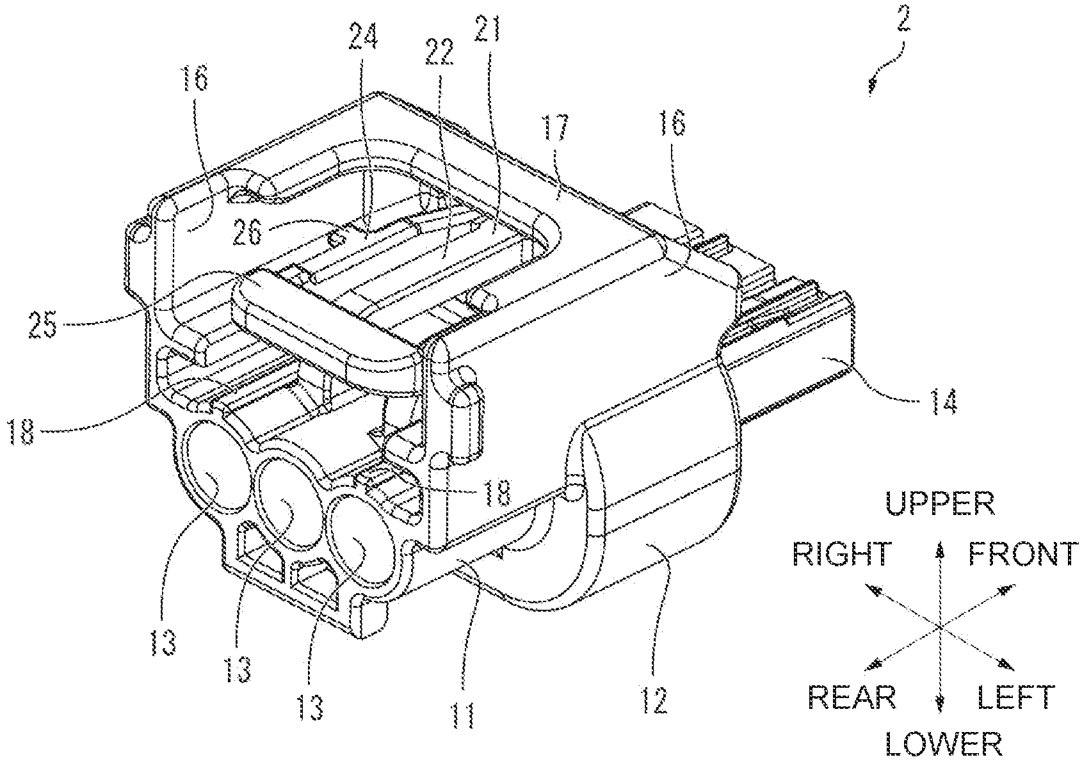
FIG. 10 is a view corresponding to FIG. 4 and showing a modification of the housing.

In this state, when the fitting detection member 4 is pushed forward so as to be displaced to the final locking position, the locking claw 46 rides over the locking piece 23 from an upper side to the front side, so that the arm piece 45 is restored from the elastic deformation, and the locking claw 46 and the locking piece 23 are locked (see FIG. 9). Therefore, the fitting between the connector 1 and the counterpart connector is completed. In the state in which the connector 1 and the counterpart connector are fitted, the counterpart terminal is inserted into the terminal 51, and the terminal 51 and the counterpart terminal are electrically connected.

Releasing Procedure for Fitting Between Connector 1 and Counterpart Connector Hereinafter, a releasing procedure for fitting between the connector 1 and the counterpart connector will be described. In order to release the fitting between the connector 1 and the counterpart connector, first, the fitting detection member 4 is pulled rearward and is returned from the final locking position to the temporary locking position.

Next, the lock release operating portion 25 of the locking mechanism 20 in the housing 2 is pressed downward. Thus, the release arm 24 is swung, the locking piece 23 of the lock arm 21 is displaced upward, and the locking between the locking piece 23 and the locking portion of the counterpart housing is released. In this state, the connector 1 and the counterpart connector are moved away from each other, so that the fitting between the connector 1 and the counterpart connector is released.

When the lock release operating portion 25 is pressed down, if the lock release operating portion 25 is pressed down more than necessary, the lock release operating portion comes into contact with the restriction rib 18 (see FIG. 4) of the housing 2, and the swing of the release arm 24 after the contact is restricted. Therefore, breakage or damage of the locking mechanism 20 due to excessive displacement of the release arm 24 is prevented.

Terminal Extracting Method

Figure 7:
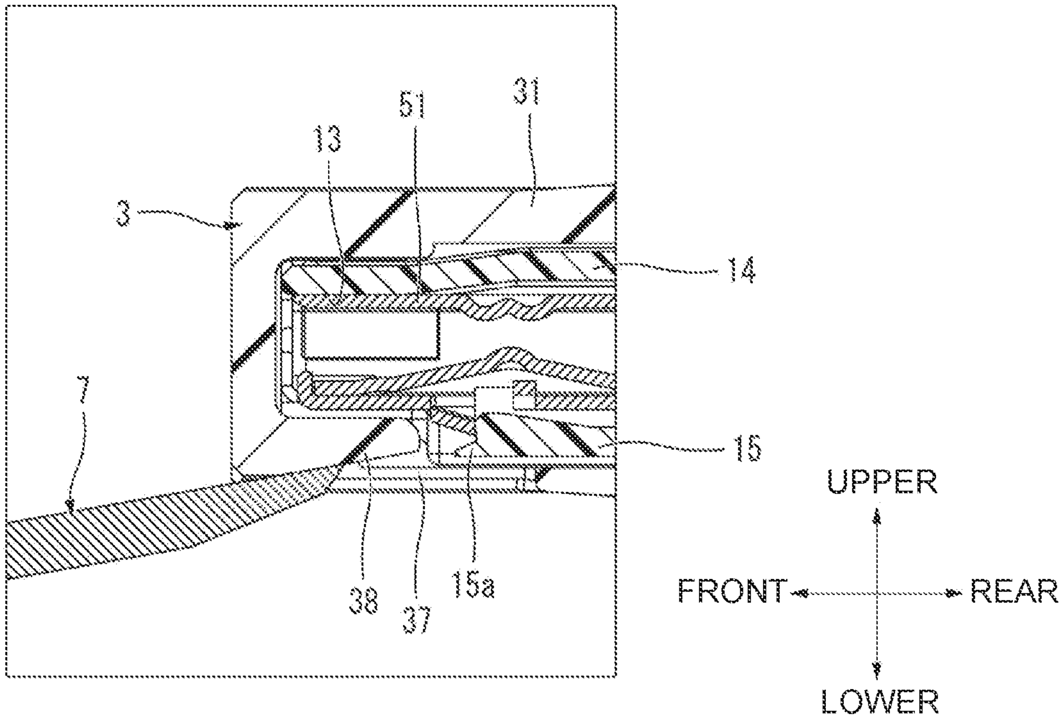
FIG. 7 is a first view of showing a terminal extracting method according to an embodiment of the present disclosure, and corresponds to a portion B in FIG. 6.

Hereinafter, a terminal extracting method will be described with reference to FIGS. 7 and 8. In order to extract the terminal 51 from the terminal accommodating chamber 13, it is necessary to release the locking between the terminal 51 and the locking lance 15 of the housing. Therefore, first, the jig 7 is inserted into the terminal accommodating chamber 13 via the jig insertion port 37 from the front side. The insertion of the jig 7 into the terminal accommodating chamber 13 is performed by moving the jig 7 substantially in the front-rear direction while the jig 7 is in contact with the guide portion 38 (see FIG. 7). This insertion is continued until the jig 7 reaches the jig hooking portion 15*a* of the locking lance 15 in the housing 2.

Figure 8:
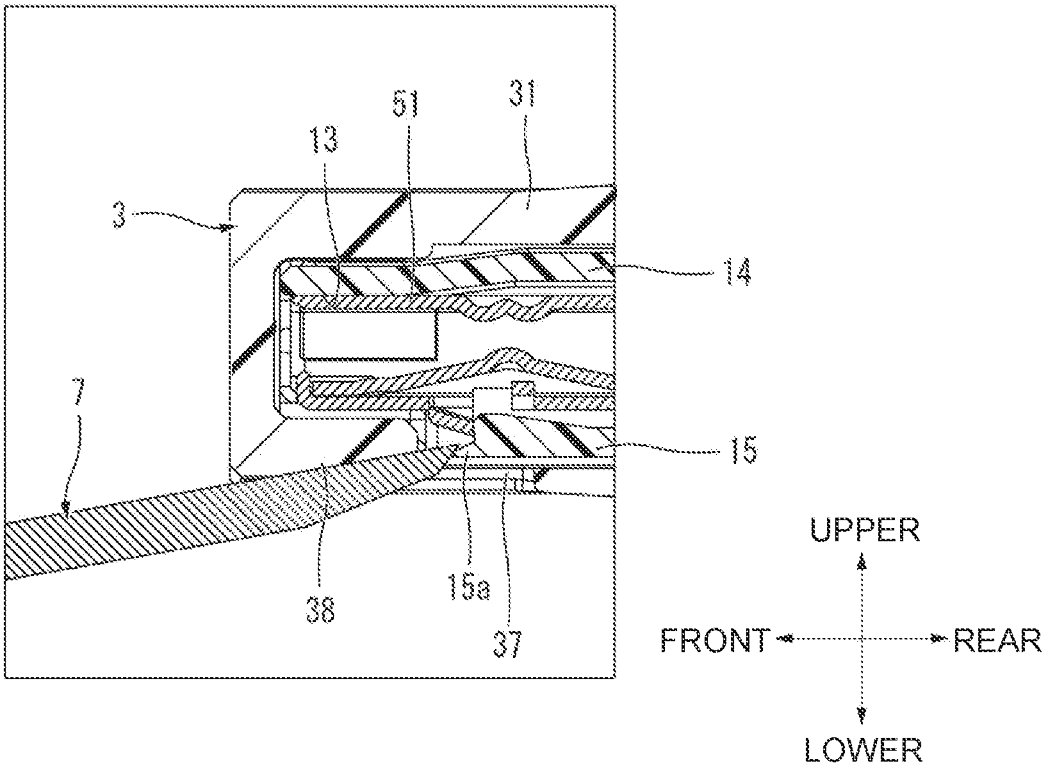
FIG. 8 is a second view of showing the terminal extracting method according to the embodiment of the present disclosure, and corresponds to the portion B in FIG. 6.

When inserting the jig 7 into the terminal accommodating chamber 13, the jig 7 is guided to the jig hooking portion 15*a* by the guide portion 38 (see FIG. 8). When the jig 7 reaches the jig hooking portion 15*a*, a distal end portion (the rear end portion in FIG. 8) of the jig 7 is disposed between the terminal 51 and the jig hooking portion 15*a* so as not to come into contact with the jig hooking portion 15*a* and not in contact with the terminal 51.

In this state, the locking lance 15 is elastically deformed downward by pressing the jig 7 downward. Thus, the locking between the terminal 51 and the locking lance 15 is released, and in this state, the terminal 51 can be removed (extracted) from the terminal accommodating chamber 13 by pulling the terminal 51 rearward.

As a result, the jig 7 does not interfere with the terminal 51 at the time of inserting the jig 7 into the terminal accommodating chamber 13, so that it is possible to prevent a defect of the terminal due to the terminal extracting work. Further, it is sufficient to simply insert the jig 7 into the terminal accommodating chamber 13 in a state of being in contact with the guide portion 38, so that the workability of the terminal extracting work is excellent. As described above, in the connector 1 and the terminal extracting work in the connector 1 according to the present embodiment, workability is excellent while preventing the defect of the terminal 51 due to the terminal extracting work.

Other Embodiments

The present disclosure is not limited to the embodiments described above, and modifications, improvements, and the like can be made as appropriate. In addition, materials, shapes, sizes, numbers, arrangement positions and the like of components in the above-described embodiment are freely selected and are not limited as long as the present disclosure can be implemented.

In the above embodiment, the restriction rib 18 is provided in the substantial center in the left-right direction of the rear end portion of the housing body 11 (see FIG. 4). Alternatively, for example, a pair of restriction ribs 18 may be provided at both end portions of the rear end portion of the housing body 11 in the left-right direction (see FIG. 10). In this case as well, the protruding height (length in the upper-lower direction) of the restriction rib 18 is set so that the lock release operating portion 25 is not pressed down more than necessary.

Here, the features of the embodiments of the connector and the terminal extracting method in the connector according to the present disclosure described above are briefly summarized and listed in (i) to (iii) below.

(i)

A connector (1) comprising:

a terminal (51);

a housing (2) having a terminal accommodating chamber (13) in which the terminal is accommodated; and a side retainer (3) attached to the housing, in which the terminal accommodating chamber (13) is provided with an elastically deformable locking lance (15) extending in an insertion direction (front-rear direction) of the terminal (51) into the terminal accommodating chamber (13) such that the locking lance (15) is to be locked to the terminal (51), a distal end portion (front end portion) of the locking lance (15) in the insertion direction is provided with a jig hooking portion (15*a*) to come into contact with a jig (7) inserted into the terminal accommodating chamber (13) when releasing locking with the terminal (51), and the side retainer (3) is provided with a guide portion (38) configured to guide the jig (7) such that the jig (7) comes into contact with the jig hooking portion (15*a*) and does not interfere with the terminal (51) when being inserted into the terminal accommodating chamber (13).

According to the connector having the configuration of the above (i), the side retainer is provided with the guide portion that guides the jig such that the jig comes into contact with the jig hooking portion and does not interfere with the terminal when being inserted into the terminal accommodating chamber. As a result, at the time of the terminal extracting work, since the jig does not interfere with the terminal, a defect of the terminal due to the terminal extracting work can be prevented, and since it is sufficient to simply insert the jig in to the terminal accommodating chamber in a state of being in contact with the guide portion, the workability is excellent.

(ii)

In the connector (1) according to the above (i), the guide portion (38) is formed in an inclined shape to guide the jig (7) between the terminal (51) and the jig hooking portion (15*a*).

According to the connector having the configuration of the above (ii), the guide portion is formed in an inclined shape, so that it is possible to more smoothly insert the jig into the terminal accommodating chamber, and the workability of the terminal extracting work is further improved.

(iii)

A terminal extracting method in a connector including the connector (1) according to (i) and a jig (7), the terminal extracting method in a connector comprising:

a step of inserting the jig (7) into the terminal accommodating chamber (13) in a state of being in contact with the guide portion (38) such that the jig (7) comes into contact with the jig hooking portion (15*a*); and a step of operating the jig (7) such that the locking lance (15) is elastically deformed to release locking between the terminal (51) and the locking lance (15).

According to the terminal extracting method in a connector having the configuration of the above (iii), it is sufficient to simply insert the jig into the terminal accommodating chamber in a state of being in contact with the guide portion, and to operate the jig such that the locking lance is elastically deformed to release locking between the terminal and the locking lance. As a result, since the jig does not interfere with the terminal, a defect of the terminal due to the terminal extracting work can be prevented, and since it is sufficient to simply insert the jig in to the terminal accommodating chamber in a state of being in contact with the guide portion, the workability is excellent.

What is claimed is:

1. A connector comprising:

a terminal;

a housing having a terminal accommodating chamber extending in a front-rear direction in which the terminal is accommodated, the housing further comprising a housing body and a hood portion which covers an outer peripheral surface of the housing body with a space provided therebetween, a front end portion of the housing body protruding forward from a front end surface of the hood portion;

a seal member attached to the outer peripheral surface of the housing body covered by the hood portion; and a side retainer attached to the front end portion of the housing body, wherein the side retainer includes a retainer upper face portion and retainer lower face portion that are spaced apart from each other in an upper-lower direction and face each other, and a retainer curved face portion that connects respective one lateral end edges of the upper face portion and the lower face portion, the terminal accommodating chamber is provided with an elastically deformable locking lance extending in an insertion direction of the terminal into the terminal accommodating chamber in a cantilever manner such that the locking lance is to be locked to the terminal, the locking lance is provided so as to face the terminal accommodating chamber from below and to extend forward, a lower end portion of a distal end portion of the locking lance in the insertion direction is provided with a jig hooking portion so as to project forward to come into contact with a jig inserted into the terminal accommodating chamber when releasing locking with the terminal, the side retainer is provided with a guide portion configured to guide the jig such that the jig comes into contact with the jig hooking portion and does not interfere with the terminal when being inserted into the terminal accommodating chamber, the retainer lower face portion is provided with a jig insertion port penetrating in the upper-lower direction, and the distal end portion of the locking lance including the jig hooking portion is exposed downward through the jig insertion port, and the guide portion is provided at a front end portion of the jig insertion port.

2. The connector according to claim 1, wherein the guide portion is formed in an inclined shape that is formed at a location of a lower surface of the retainer lower face portion corresponding to the front end portion of the jig insertion port, the inclined shape rising from a front side toward a rear side.

3. A terminal extracting method in a connector including the connector according to claim 1 and a jig, the terminal extracting method in a connector comprising:

inserting the jig into the terminal accommodating chamber in a state of being in contact with the guide portion such that the jig comes into contact with the jig hooking portion; and operating the jig such that the locking lance is elastically deformed to release locking between the terminal and the locking lance.

* * * * *